May 21, 1968 G. SWIFT 3,383,913
MEASUREMENT OF PAVEMENT DEFLECTION

Filed March 1, 1967 2 Sheets-Sheet 1

GILBERT SWIFT
INVENTOR.

BY William E. Johnson Jr.
ATTORNEY.

May 21, 1968 G. SWIFT 3,383,913
MEASUREMENT OF PAVEMENT DEFLECTION
Filed March 1, 1967 2 Sheets-Sheet 2

GILBERT SWIFT
INVENTOR.

BY William E. Johnson, Jr.
ATTORNEY.

United States Patent Office 3,383,913
Patented May 21, 1968

3,383,913
MEASUREMENT OF PAVEMENT DEFLECTION
Gilbert Swift, Houston, Tex., assignor to Dresser Industries, Inc., Dallas, Tex., a corporation of Delaware
Filed Mar. 1, 1967, Ser. No. 619,767
6 Claims. (Cl. 73—146)

ABSTRACT OF THE DISCLOSURE

A pair of substantially identical road logging carriages are towed in line behind a loaded vehicle, providing a means for distinguishing between the ability of the pavement to withstand a load and the roughness characteristics of the road.

---

This invention relates to a novel method and apparatus for determining, while mobile, the elastic properties of materials forming a structure.

"Structure," as used throughout this application, shall mean any stretch formed of material and shall include natural terrain, various courses of roadways including finished pavement, airstrips, bridges, foundations, dams, and the like.

In order to be able to determine the strength, durability, condition, and other features of a structure, it is necessary to first ascertain various properties and characteristics thereof. Some of these are the elastic properties, such as stiffness and flexure. Knowledge of such properties enables construction personnel to ascertain if a structure has been adequately compacted and to determine the load bearing capability and the durability thereof. In order to utilize such knowledge during the process of construction, it is highly desirable that the information necessary to ascertain the results be obtained in a fast and economical manner. It is also desirable to have a fast and economical means of surveying finished roadways to find substandard and defective but remediable areas in order to permit timely repair.

The various stationary processes of determining elastic properties of a roadway, such as the Benkelman Beam Test and Plate Bearing Test are based on the principle of measuring displacement under a known force. In general, a known weight is placed on the surface of the structure and the amount of displacement or deflection of the structure resulting from such weight is measured. While such processes fulfill the need of providing a means for determining pavement deflection at any one location, the processes are time consuming and only give the deflection at the location tested. Since such processes are time consuming, there is a need for a more expeditious method of determining pavement deflection.

The stationary processes of measuring deflection do not fulfill the need of providing a process for making an overall survey of the roadway from which probable areas of substandard construction may be easily determined. Being able to locate such areas would permit remedial action prior to serious deterioration. Also, due to the fact that present stationary processes are time consuming, they are used mainly for research rather than as a construction maintenance aid on a day-to-day basis. Therefore, there is a need for a method of expeditiously surveying the elastic properties of a structure to permit overall evaluation of the structure as an aid in maintenance.

The stationary processes for testing the strength of a structure are used mainly on paved roadways and not during construction. Therefore, there has also been a need for a method which may be utilized to expeditiously determine, either in a stationary or mobile manner, the strength of a course as it is being constructed. Such knowledge will facilitate ascertaining in what degree of compaction the materials being used will provide adequate strength. Material costs vary in accordance with the volume used, and the cost of compacting effort depends upon the number of passes made or time spent; therefore, it is uneconomical to use more materials and compacting effort than is necessary to achieve the desired result. Accordingly, there has also been a need for a method of testing the strength of a course during construction which can promptly indicate when the desired result has been achieved, whereby the use of surplus material and excess compacting effort is avoided.

In my co-pending U.S. application, Ser. No. 386,342 filed July 30, 1964, for "Method and Apparatus for Determining Deflections of a Structure," assigned to the assignee of the present invention, there is disclosed a novel method and apparatus for rapidly determining the elastic properties of structure formed of materials of all kinds. It is the object of the present invention to provide in some respects an improvement on such method and apparatus by taking measurements while in transit. The method disclosed in the aforesaid application comprises, broadly, the impressing upon the structure being tested of a cyclic repetitive force, and determining a characteristic of the deflections resulting therefrom. One form of apparatus for performing this method may be comprised of a force generating means which will provide a cyclic downward force, coupling means for mechanically coupling such force to the structure being tested, and instrumentation for determining the resulting deflection. The force generating means may be formed by rotating two masses synchronously in opposite directions in a vertical plane. The masses are arranged with respect to a mechanical coupling means which may be formed with a single wheel trailer so as to produce a cyclic variation of the downward force exerted by the wheel of the trailer on the surface of the structure being tested. The trailer is so designed with respect to the force generated by the rotatable masses that there will always be downward force acting against the surface, thus avoiding any negative force during the entire cycle of the rotating masses. The material of the structure being tested yields and returns to the original configuration in synchronism with the repetitive forces of the wheel of the trailer thereagainst.

Instrumentation is shown in my co-pending application whereby the deflection may be measured while stationary or while in transit. An object of the present invention is to provide an improved method of measuring such deflection while in transit.

The deflection of the surface of a structure is customarily measured in a stationary manner by observing the displacement of a point close to the point of application of the force, relative to the position of a reference point located five to ten feet away, as the load is either brought to bear or removed. Such a method might be rendered mobile and continuous by substituting wheels for points and by measuring the relative displacement of these wheels as they travel along with the load. However, in order to accomplish the measurement by this means, the surfaces over which it is moved would require to be smooth in comparison with the magnitude of the deflections produced near the load. With less than this degree of smoothness, a measurement made in this way would contain unacceptable errors.

One of the principal obstacles in measuring the deflection of the road while in transit is that of obtaining a reference point (other than a stationary one) against which to make the measurement. Since roadways are never perfectly smooth and the vertical irregularities quite often exceed the vertical deflections produced by the test load, a reliable moving reference point is difficult to obtain. Certain solutions have been proposed for achieving the mobile reference point by means of special gyroscopes with extreme precision and high cost, but these solutions remain impractical. Accordingly, the problem of detecting from a moving vehicle the amount of vertical deflection of the roadway beneath one or more of its wheels has heretofore been deemed too difficult and too expensive to warrant further attention.

The presently proposed solution to this problem employs a combination of simple well known devices to achieve the desired result. A first carriage is suspended beneath the vehicle and towed along with a second, substantially identical, carriage being moved simultaneously in line with the first carriage at a distance of approximately five to twenty feet behind. In the preferred embodiment, each carriage has a front wheel, a center wheel and a rear wheel, all running in line. A rigid frame is supported by the front and rear wheels, from which the center wheel is suspended on each carriage. The suspension is arranged to allow upward and downward motion of the center wheel without allowing sideward motion and is equipped with a sensing device to produce indications of displacements of the center wheel with respect to the frame. The center wheel of the first carriage is placed between a pair of dual tires of the load bearing vehicle, or otherwise in very close proximity to the point of application of the load. The center wheel of the second carriage is purposely remote from this or any other load application point. Both carriages traverse the same track along the roadway. It should be apparent that one is doing so while the load is present, and the other is doing so either before the load is applied or at a sufficient time afterward so that the effect of the load has disappeared. Accordingly, the displacement sensing devices on both carriages undergo substantially identical motions due to roughness and other departures of the roadway from a perfect plane surface, but undergo different motions due to the deflection of the road under a traveling load. It should be appreciated that the roughness and other inherent irregularities of the road, while producing identical displacements, do not do so at the same time for both carriages. Thus, in order to cancel these displacements and thereby observe the displacement due to the load only, it is necessary first to delay the indications of one sensor, and then to subtract or otherwise compare the indications of the other. This may be done in numerous ways. One, of course, is by applying a time delay; however, this would require the load vehicle to travel at a particular constant rate of speed so that the information is delayed exactly the right length of time elapsed between the carriages passing a given point. Another way of delaying the signals in order to compare them with or subtract them from each other, utilizes a distance delay rather than a time delay device. One such delay device makes use of a magnetic tape or drum driven not at a constant speed but driven in proportion to the distance traveled by the vehicle. With this arrangement, together with suitable means for impressing the data on a magnetic tape and suitable pick-off means, the data is delayed a variable amount of time by an amount of which always corresponds to the time required for the vehicle, and hence the carriages, to travel a fixed distance. By proper adjustment, this distance is made equal to the spaces between the carriages. In using this system, it is preferable that the recording is done on a tape which is not sensitive to the velocity of the vehicle. Accordingly, flux sensitive play-back and recording heads rather than heads which respond to the rate of change of flux are preferred.

Still another delay method employs a multiple strip-chart recorder. The chart paper is generally made to travel in proportion to the distance traveled by the vehicle, and the pens are offset along the longitudinal axis of the chart to write at positions displaced on the chart a distance representative of a space between the carriages. Each pen records the displacement of one center wheel with respect to the frame of its respective carriage. The separation between the various recorded traces represents the deflection of the road under the applied force, since roughness alone will be detected by both carriages and produce no separation of the traces.

Many other objects, advantages and features of this invention will become more readily apparent from the following detailed description when read in conjunction with the accompanying drawings, which illustrate several useful embodiments in accordance with the invention, wherein.

Figure 1:
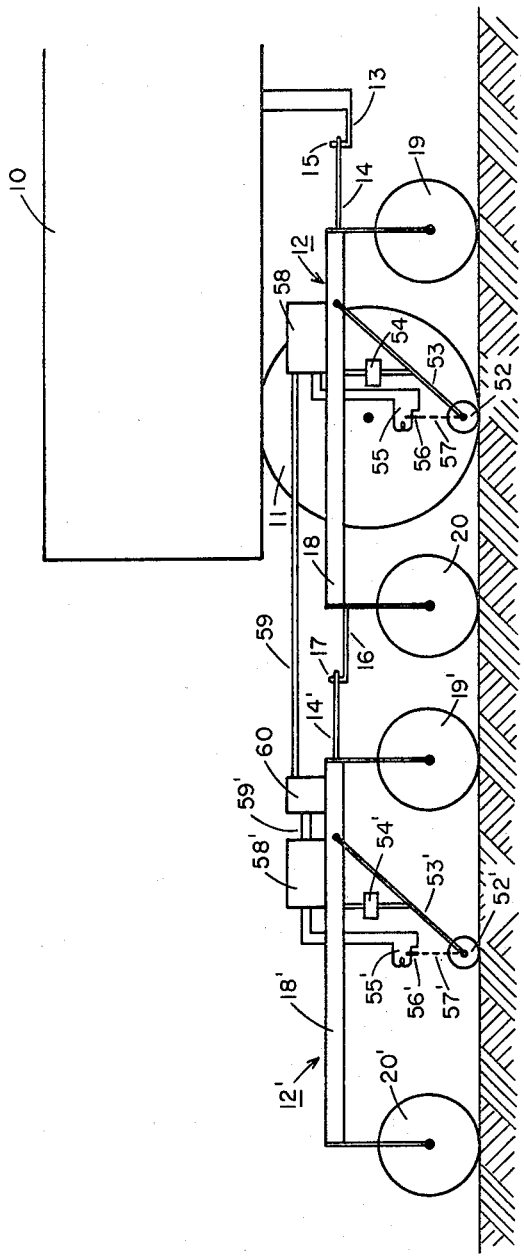
FIGURE 1 is a schematic representation of a vehicle towing a pair of road logging carriages according to the invention.

Referring now specifically to FIGURE 1, there is illustrated a vehicle 10 which may be any vehicle which is suitable for applying a load to the structure. For example, this may be a vehicle having an apparatus as described in co-pending application Ser. No. 386,342 for supplying a cyclic variation of downward force to the structure or could merely be a vehicle having a heavy load thereon such as, for example, a loaded trailer truck. It should be appreciated that the type of vehicle forms no part of this invention and can be any suitable means for applying a load to the structure being tested. In the vehicle 10 which is illustrated, the load is applied to the structure through the wheel 11. Attached to the underneath side of the vehicle 10 there is a support member 13 mounted thereon having a ball hitch 15 which provides a means for towing the carriages described hereinafter.

The first carriage 12 is connected to a conventional ball hitch member 15 by means of a tongue member 14 which is used to pull the carriage 12 along behind the vehicle 10 but which does not prevent the carriage from having up and down motion. It should be appreciated that, for best results, the coupling between the carriage and the vehicle is a somewhat flexible one and that the vehicle merely pulls the carriage along behind and does not impart to it any other forces. The carriage 12 has a solid member 18 which is supported by the wheels 19 and 20.

A contact member in the form of contact wheel 52 is supported on the lower end of contact arm 53, the upper end of which is pivotally secured to the member 18. Arm 53 is biased downwardly by bias spring 54 such that a continuous contact point is maintained with the structure surface during horizontal movement therealong. A relative displacement sensing means is then spaced between the member 18 of the carriage 12 and contact wheel 52 in the form of a coil 55 having core 56 passing therethrough. Core 56 is connected to the contact wheel 52, being shown as connected by the dotted line 57. The coil 55 is connected to a conventional relative displacement circuit 58. During relative vertical movement of the contact wheel 52 with respect to the frame member 18, an electrical signal is generated which is representative of the relative displacement between the two. During movement along the structure surface, the relative displacement circuit 58 determines the relative displacement of contact wheel 52 with respect to the frame 18 of the carriage 12.

There are many alternate means for sensing the vertical movement of the vehicle and the relative vertical movement of the contact point 52 with respect to the vehicle. For example, different combinations of accelerometers and sensing devices may be used in connection with the carriage 12, some of which are described in my co-pending application Ser. No. 428,956, filed Jan. 29, 1965. It should be appreciated that the type of device or devices which is used or mounted on the carriage 12 can be quite varied, but that the device which has been illustrated is used merely to show one type of sensor which gives an indication of displacement between the carriage and the structure.

Another substantially identical carriage 12' is towed behind the first carriage 12 by means of the tongue member 14' and the ball hitch member 17 which is connected by way of the member 16 to the frame 18 of the first carriage 12. Since carriages 12' and 12 are substantially identical, prime numbers have been used in the drawing to indicate the similarities. For example, the wheel 20' on the carriage 12' is substantially identical to the wheel 20 on the carriage 12. Thus, it should be appreciated that as the two carriages 12 and 12' are towed along by the vehicle 10, the contact wheels 52 and 52' are towed in line, the wheels 19 and 19' are towed in line, and the wheels 20 and 20' are towed in line. At each point in the road where there is a roughness characteristic, the sensing wheels 52 and 52' will detect the roughness. In the relative displacement sensing circuits 58 and 58', aside from the load carrying characteristics of the structure, the roughness characteristics of the structure should produce identical signals in coils 55 and 55', except that the signal induced in coil 55 naturally occurs before that induced in coil 55'. The output of the circuit 58' is connected by wires 59' to a conventional summing circuit 60. Likewise, the output of circuit 58 is connected by wires 59 to the same circuit 60. The circuit 60 can take many forms. For example, it may employ apparatus such as magnetic tape or drum (not illustrated) which is driven in proportion to the distance traveled by the vehicle. By using suitable and well-known pick-off means, the data from the first carriage 12 is delayed a variable amount of time, the amount of which always corresponds to the time required for the carriage to travel a fixed distance. Because the roughness characteristics of the road are identical as picked up by the contact wheels 52 and 52', whenever the data from the circuits 58 and 58' are displayed together, the roughness characteristics are cancelled out and only the load handling characteristics as picked up by the contact wheel 52 will be shown in the resulting data. Although the amount of separation which is needed between the wheels on the carriages will vary depending upon the structure being tested and upon the weight being applied thereto, it has been found that a separation of seven feet between the contact wheel 52 and the wheel 19 and a like figure between the wheel 52 and the wheel 20 provides an adequate separation. Using seven feet as an example, wheel 52' would always be at least fourteen feet plus the distance between the wheels 19' and 20 from the application of the load, thus eliminating any probability that the contact wheel 52' would be influenced by the weight of the vehicle 10. Still another delay method employs a conventional multiple strip-chart recorder (not illustrated). The chart paper in such multiple strip-chart recorders is generally made to travel in proportion to the distance traveled by the vehicle, and the pens are offset along the longitudinal axis of the chart to write at positions displaced on the chart a distance representative of the space between the carriages, a representative chart being illustrated in FIGURE 4, and described hereinafter. Each pen records the displacement of one center wheel, being contact wheel 52 and contact wheel 52', with respect to the frame of the carriage. The separation between the various recorded traces represents the deflection of the structure under the applied force, since roughness alone will be detected by both carriages and will be cancelled out. Thus, it should be appreciated that the separation between the traces is a function only of the load handling characteristic of the structure.

Figure 2:
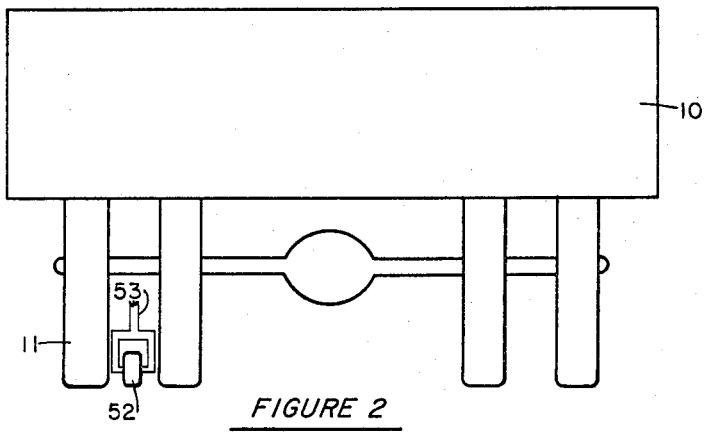
FIGURE 2 is a schematic representation of a vehicle and the relationship between a sensing wheel located on one of the carriages of FIGURE 1 and the wheels of the vehicle.

FIGURE 2 illustrates a schematic representation of the end view of the vehicle 10 having a pair of wheels 11 on each side of the vehicle, the wheels 11 being used to impart a load to the surface of the structure being tested.

The contact wheel 52, being supported by the arm member 53, is preferably placed as close to one of the wheels 11 and in contact with the surface of the structure as is possible. While the contact wheel 52 is illustrated as being between the wheels 11, it should be appreciated that it could also be placed at various points around the wheels. For example, it could be placed on the outsides of the wheels 11 or on the insides of the wheels, in front of the wheels or behind the wheels.

Figure 3:
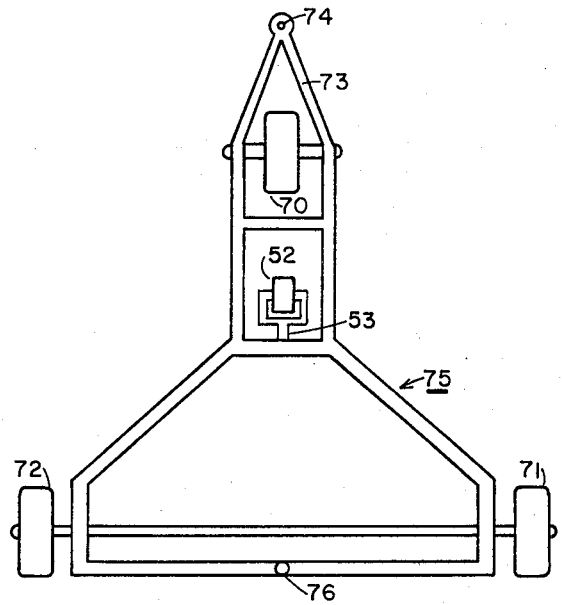
FIGURE 3 is a top view of one of the carriages according to the invention.

FIGURE 3 illustrates another embodiment of one of the carriages according to the invention. Although one carriage is illustrated, it should be appreciated that to practice the invention there would be another substantially identical vehicle. The vehicle 75 in this embodiment has three wheels 70, 71 and 72 for moving the carriage along the surface of the structure. The contact wheel 52 is secured by means of the arm member 53 to the frame of the carriage just as was illustrated in FIGURE 1 so that relative displacement of the wheel 52 can be measured with respect to the frame of the carriage. The tongue member 73 has a hole 74 in the end for providing coupling to a ball hitch member (not illustrated) on the towing vehicle. A ball hitch member 76 is provided on the back part of the frame of the carriage 75 for providing coupling to the second carriage which is to be towed along behind the carriage 75.

Thus, it should be appreciated that whereas one embodiment of the carriage according to the invention has three wheels in line, that is, a front wheel, a rear wheel and a center contact wheel, and the embodiment according to FIGURE 3 has a three-wheel carriage with a fourth contact wheel, the important thing in building a carriage according to the present invention is that however many wheels are a part of the carriage, the two carriages should be substantially identical, and any given wheel on the one carriage should track its counterpart on the carriage which is behind it or in front of it. That is to say, if two carriages, as is illustrated in FIGURE 3, are used, the wheel 70 should be tracked by a wheel 70' (not illustrated), a wheel 71 should be tracked by a wheel 71' (not illustrated), and a wheel 72 should be tracked by a wheel 72' (not illustrated). Thus, it should be appreciated that the number of wheels is generally not important, but it is important that the wheels on the first carriage are tracked by the wheels on the second carriage and that the number of wheels on the first carriage is the same as the number of wheels on the second carriage.

Figure 4:
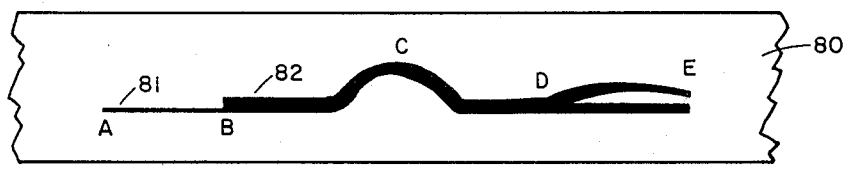
FIGURE 4 is a representation of a chart made on a multiple strip-chart recorder in a system according to the invention.

FIGURE 4 illustrates a representative chart 80 of data recorded on a conventional multiple strip-chart recorder (not illustrated) wherein line 81, commencing at point A, is indicative of the relative displacement measured by the carriage 12' and line 82, commencing at point B, is indicative of the relative displacement measured by the carriage 12. The distance from A to B is chosen to be the equivalent distance between the contact wheels 52 and 52'. Point C represents data taken as the two contact wheels 52 and 52' pass a surface irregularity area or rough spot. Since the two carriages are substantially identical, and points A and B are so spaced apart, the two lines 81 and 82 are observed to rise together at point C with no appreciable separation. At point D, line 82 is observed to rise above line 81, thus indicating that the structure has been deflected by the load. It therefore involves only a simple calibration procedure well known in the art to have the separation of the lines at point E provide a measure of pavement deflection.

While the invention has been described with respect to the preferred embodiment, it should be apparent to those skilled in the art that many other systems having at least two carriages may be readily utilized to perform the functions of the system illustrated and described, and that other changes, modifications and embodiments may be made without departing from the invention in its broader aspects. For example, while there has been described a system in which the load deflection carriage is in front of the second carriage, it should be appreciated that the load deflection carriage could be behind the other carriage. Accordingly, the invention is not to be limited, except as defined in the appended claims.

What is claimed is:

1. A system for determining the deflection of a structure under load comprising:
   (a) a moving vehicle having means thereon for applying a load to said structure;
   (b) a first carriage adapted to be moved by said vehicle, said carriage having a first structure displacement sensing device mounted thereon and adapted to sense structure displacement near the point of application of said load to said structure;
   (c) a second carriage substantially identical to said first carriage and adapted to be moved by said vehicle simultaneously with said first carriage, said second carriage having a second structure displacement sensing device mounted thereon and adapted to sense structure displacement sufficiently removed from the point of application of said load to said structure as to be unaffected by said load;
   (d) means for producing a first electrical signal from said first sensing device indicative of both the roughness and deflection of said structure;
   (e) means for producing a second electrical signal from said second sensing device indicative only of the roughness of said structure; and
   (f) means for combining said first and second electrical signals to provide an indication of said deflection.

2. The system according to claim 1 wherein said first and second carriages have the same number of wheels and are so arranged that each of the wheels on said second carriage tracks its respective counterpart on said first carriage.

3. The system according to claim 2 wherein said vehicle pulls said first carriage and said first carriage simultaneously pulls said second carriage.

4. The system according to claim 1 wherein said means for combining said first and second electrical signals comprises a circuit for subtracting said second signal from said first signal.

5. The system according to claim 1 wherein said means for combining said first and second electrical signals comprises circuitry having a delay equal to the time elapsed between said carriages passing over the same spot on the surface of said structure.

6. The system according to claim 5 wherein said circuitry includes memory means for storing said first electrical signal for at least the amount of said delay time.

References Cited

UNITED STATES PATENTS 3,353,404   11/1967   Swift _____ 73—146

DAVID SCHONBERG, *Primary Examiner.*

D. O. WOODIEL, *Examiner.*